Sept. 20, 1955  D. THOMAS  2,718,581
MECHANISM FOR DISINTEGRATING METALS BY AN ELECTRIC ARC
Filed April 25, 1952

INVENTOR.
Donald Thomas
BY
Thos. L. Donnelly
ATTORNEY.

United States Patent Office 2,718,581
Patented Sept. 20, 1955

2,718,581

MECHANISM FOR DISINTEGRATING METALS BY AN ELECTRIC ARC

Donald Thomas, Clinton, Mich., assignor to Clinton Machine Company, Clinton, Mich., a corporation of Michigan Application April 25, 1952, Serial No. 284,238

3 Claims. (Cl. 219—15)

My invention relates to a new and useful improvement in a mechanism for disintegrating metals by an electric arc and particularly relates to the electrode used on such mechanism.

In machines used for disintegrating metals by means of an electric arc, it is customary to rapidly reciprocate the electrode into and out of contact with the work-piece while at the same time directing a stream of coolant through or against the electrode.

Such disintegrating machines have proven themselves useful in removing broken drills and taps from a workpiece and also useful for cutting holes through a workpiece, thus substituting for a drilling operation.

In the operation of such mechanism, where a hollow electrode is used, frequently a stem of the work-piece will extend into the electrode, the electrode merely effecting a cutting of a circle around this central stem.

In such a cutting operation a fractionating of the workpiece is effected and where the hollow electrode is used, this fractionating becomes localized to the area of the end of the electrode. It has been found that by utilizing a pair of concentrically arranged electrodes through each of which the coolant is directed, a complete fractionating through the area defined by the outside diameter of the larger electrode is accomplished and it is the object of the present invention to provide an electrode of this type so that the results mentioned may be obtained.

Another object of the invention is the provision of a pair of concentrically arranged tubular electrodes with coolant flowing through the inner electrode and also flowing therefrom into the outer electrode. The coolant flowing out of the ends of the two electrodes will then flow upwardly in the hole or passage formed in the work-piece around the periphery of the outer electrode and thus pass out of the cavity or passage which has been formed in the work-piece.

By arranging the electrodes concentrically with the coolant flowing through both electrodes a washing of the fractionated particles outwardly to pass upwardly of the outer electrode is effected and thus the inner electrode is kept clear of any projecting particles or spikes which might otherwise form on the work-piece.

Other objects will appear hereinafter.

It is recognized that various modifications and changes may be made in the detail of the structure illustrated without departing from the invention and it is intended that the present disclosure shall be considered but the preferred embodiment.

Forming a part of this application are drawings in which.

Figure 1:
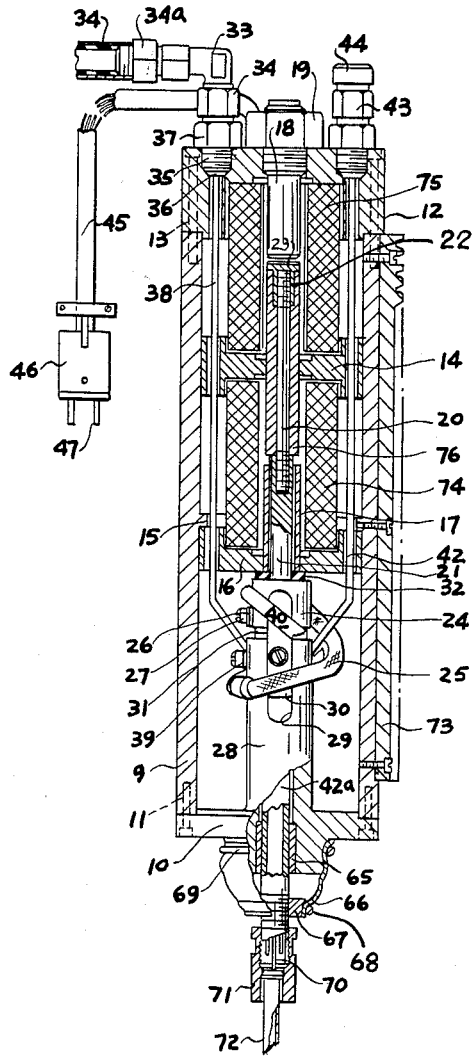
Fig. 1 is a longitudinal central sectional view of the reciprocating mechanism to which the electrode is to be attached.
Figure 2:
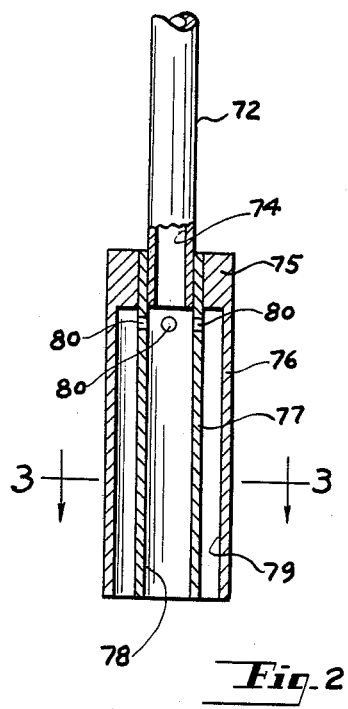
Fig. 2 is a longitudinal central sectional view of the electrode slightly enlarged.
Figure 3:
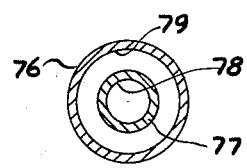
Fig. 3 is a sectional view taken on line 3—3 of Fig. 2.

I provide a metallic houning 9 having a bottom 10 formed from non-metallic metal, preferably aluminum, this bottom 10 being secured by the screws 11 to the housing 9. A top or end plate 12 is secured by the screws 13 to the housing 9. Pressed into the lower end of the housing so as to engage the under face of the flange 15 is a supporting plate 16 which serves to support the solenoid coil 74. Positioned in the housing 9 as a slip fit is the plate 14 which rests upon the upper end of the lower coil 74. An upper coil 75 rests upon the plate 14. Plate 16 may be referred to as the lower magnet end and plate 14 as the center magnet and the end plate 12 as the upper magnet end. Pressed into a central opening in the lower magnet end 16 and extending upwardly therefrom is the lower pole piece 17. An upper pole piece 18 is projected through the end plate 12 and provided with an adjusting nut 19 so that this upper pole piece may be adjusted longitudinally. A common armature 76 is provided for the coils 74 and 75. Extended through the armature 76 is a rod 20 which is threaded at its lower end to the upper end of the spindle 21. Threaded on to the upper end of the rod 20 is an internally threaded sleeve 22 carried by the plate 23. Formed on the spindle 21 is the enlarged body or head 24.

An electric conductor 25 is provided at one end with the terminal 26 connected to the head 24 and held in position by the screw 27. The opposite end of this conductor is electrically connected to the post 28, which is formed integral with and projects upwardly from the base or bottom 10. In this manner the spindle 21 is electrically connected to the housing 9. This post 28 has a slot 29 formed therein for reception of a key 30 which seats in a groove formed in the spindle 21 so as to prevent rotation of the spindle 21 relatively to the member 28, the slot 29 being of sufficient length to permit longitudinal movement of the spindle 21 relatively to the member 28. Resting upon the upper end of the post 28 are washers 31, which serve as abutment members for engaging the boss 24. Embracing the spindle 21 and positioned above the boss 24 is a yieldable abutment washer 32.

A fitting 33 is connected to the nipple 34a which is mounted on the end of the tubular member 34. This tubular member 34 comprises a sheath of electrical conducting material, preferably copper, which is lined on its inner surface with a lining of rubber or similar material so that the member 34 will serve as a conductor of current and at the same time as a conductor of cooling fluid used with the invention. This fitting 33 is electrically connected to the fitting 34 which is threaded at its lower end into the opening 35 formed in the top 12 and which serves to engage and compress a sealing ring 36 positioned in the bottom of the opening or pocket 35. A lock nut 37 is threaded on to the fitting so that it may be secured in position to compress the member 36. Extended through this member 36 and projecting upwardly into the fitting 34 is a conducting tube 38 so that the coolant delivered through the conductor 34 passes downwardly through the tubes 38 and is connected in communication with the tube 40 supported by the bracket 39. This tube 40 communicates with the interior of the head 24, the spindle 21 being formed hollow downwardly from the head 24 so that the coolant is thus delivered through the spindle 21. Connected in communication with the bore 42a, formed in the post 28, is a tube 42 extending into the fitting 43 which is provided with a closure or cap 44. Upon removal of the cap 44 oil or other suitable lubricant may be deposited for passage through the tube 42.

An electric cable 45, through which extend four electric wires, is provided with a plug 46 having four connecting prongs 47, which are adapted to plug into a receptacle. Two of the wires are connected to opposite ends of the solenoid coil 74 and two of them are connected to the opposite ends of the solenoid coil 75, so that when the socket plug is plugged into a receptacle these solenoid coils will be connected to an electric source through rectifiers so that the coils 74 and 75 may be alternately energized and deenergized.

The spindle 21 is adapted to reciprocate in bushings 65. A flexible cover sleeve 66 is mounted on a collar 67 which is attached to the spindle 21, this cover being held in position by the clamping ring 68. The upper end of the cover sleeve 66 is held in position on the bottom 10 by means of a clamping ring 69. Positioned in the lower end of the spindle 21 is a collet 70 adapted for being held in position and moved to closing position by means of the thrust sleeve 71, which is threaded on the lower end of the spindle 21.

The structure described above of itself is not claimed in this application, the same being claimed in application Serial No. 230,921, filed June 11, 1951, by W. E. Delhorbe.

Projected into this collet is a shank 72, the collet serving to retain the shank 72 in any longitudinal position desired. The shank 72 is provided with a passage 74 therethrough so as to receive the coolant which passes through the spindle 21. Fixedly mounted on the end of shank 72 is the head 75 of an outer electrode 76 having the bore 79 formed therein. Mounted in this head 75 is a central electrode 77 having a passage 78 formed therethrough. The ends of the concentric electrodes, in the operation of the machine, are brought into engagement and out of engagement with the work-piece so that an electric arc is established and the fractionating accomplished. The coolant flowing through the shank 72 may pass outwardly through the openings 80 into the interior 79 of the outer electrode. Thus there is coolant flowing through each of the concentrically arranged tubular electrodes and as the electrodes penetrate into the work-piece this coolant flows outwardly through the opening or passage formed in the work-piece around the periphery of the outer electrode 76. By carrying on the operation with the coolant so conducted and utilizing the pair of tubular concentrically arranged electrodes the results referred to are obtained and experience has shown that a very effective and quick operation may thus be accomplished.

What I claim is:

1. In combination, a reciprocating mechanism; a coolant conduit secured to and reciprocated by said mechanism; a tubular electrode secured to and projecting beyond the end of said conduit; a second tubular electrode arranged about said first mentioned electrode in concentric spaced relation, the space between the same being clear, there being formed in said first mentioned electrode an opening for passage of coolant therefrom into the interior of the outer electrode.

2. In combination with an electrode of the class described comprising: a tubular body; a coolant conduit connected to one end of said body in communication with the interior thereof; an outer tubular electrode positioned about said first mentioned electrode in concentric spaced-apart relation, the space between the same being clear, there being openings formed in said first mentioned electrode for passage of coolant into the interior of said outer electrode.

3. An electrode of the class described comprising: a tubular body; a coolant conduit connected to one end of said body in communication with the interior thereof; an outer tubular electrode positioned about said first mentioned electrode in concentric spaced-apart relation, the space between the same being clear, there being openings formed in said first mentioned electrode for passage of coolant into the interior of said outer electrode; and a head on one end of said outer electrode having an opening therethrough for reception of one end of said first named electrode and secured thereto.

References Cited in the file of this patent

UNITED STATES PATENTS

| | | |
|---|---|---|
| 1,687,081 | Chapman | Oct. 9, 1928 |
| 2,427,588 | Burnett | Sept. 16, 1947 |
| 2,462,438 | Thomas | Feb. 22, 1949 |
| 2,592,894 | Harding | Apr. 15, 1952 |

FOREIGN PATENTS

| | | |
|---|---|---|
| 681,286 | Germany | Sept. 20, 1939 |